US006399040B1

(12) United States Patent
Dafft et al.

(10) Patent No.: US 6,399,040 B1
(45) Date of Patent: Jun. 4, 2002

(54) PROCESS FOR GENERATING RECOVERABLE SULFUR CONTAINING COMPOUNDS FROM A SPENT ACID STREAM

(75) Inventors: Charles Anthony Dafft, Friendswood; Connie René White, Leaque City, both of TX (US)

(73) Assignee: Rohm and Haas Company, Philadelphia, PA (US)

( * ) Notice: Subject to any disclaimer, the term of this patent is extended or adjusted under 35 U.S.C. 154(b) by 51 days.

(21) Appl. No.: 09/585,148

(22) Filed: Jun. 1, 2000

Related U.S. Application Data
(60) Provisional application No. 60/137,288, filed on Jun. 3, 1999.

(51) Int. Cl.$^7$ .................... C01B 17/48; C01B 17/74; C23F 11/04
(52) U.S. Cl. .................. 423/539; 423/269; 423/522; 423/533; 423/540; 423/DIG. 2; 252/387
(58) Field of Search .................. 423/539, 540, 423/533, 522, 269, DIG. 2; 252/387

(56) References Cited

U.S. PATENT DOCUMENTS

| | | | | |
|---|---|---|---|---|
| 3,316,179 A | * | 4/1967 | Hoornstra et al. | 252/147 |
| 3,887,488 A | * | 6/1975 | Scott et al. | 252/389 A |
| 3,908,904 A | * | 9/1975 | Kerner et al. | 239/4 |
| 4,154,791 A | * | 5/1979 | Howells et al. | 422/12 |
| 4,256,721 A | | 3/1981 | Blakey et al. | 423/540 |
| 4,321,231 A | * | 3/1982 | Gupta | 422/12 |
| 4,339,617 A | * | 7/1982 | Imai et al. | 568/899 |
| 4,490,347 A | * | 12/1984 | Gelblum | 423/521 |
| 5,240,183 A | * | 8/1993 | Bedaw et al. | 239/403 |
| 5,553,783 A | * | 9/1996 | Slavas et al. | 239/403 |
| 5,692,682 A | * | 12/1997 | Soule et al. | 239/403 |

FOREIGN PATENT DOCUMENTS

| | | |
|---|---|---|
| DE | 28 16 469 | 8/1979 |
| EP | 0 071 837 A1 | 2/1983 |
| EP | 0 091 679 A1 | 10/1983 |
| EP | 0 516 001 A1 | 12/1992 |
| EP | 0 769 472 A1 | 4/1997 |

OTHER PUBLICATIONS

Maxey Brooke. "Corrosion Inhibitor Checklist" published in Chem. Engineering (Dec. 1954) pp. 230, 232 & 234, Dec. 1954.*

* cited by examiner

Primary Examiner—Steven P. Griffin
Assistant Examiner—Timothy C Vanoy
(74) Attorney, Agent, or Firm—Alan Holler

(57) ABSTRACT

This invention relates to a process for generating recoverable sulfur containing compounds, e.g., sulfur dioxide, from a spent sulfuric acid stream by combusting and/or thermally decomposing the spent sulfuric acid stream in a furnace. The spent sulfuric acid stream is sprayed into the furnace through a spray nozzle designed to minimize the spent sulfuric acid droplet size, e.g., to produce droplets having a Sauter mean diameter of from 200 micrometers to 700 micrometers.

9 Claims, No Drawings

PROCESS FOR GENERATING RECOVERABLE SULFUR CONTAINING COMPOUNDS FROM A SPENT ACID STREAM

Applicants hereby claim national priority benefit, under 35 USC 119(e), of U.S. provisional application No. 60/137,288, filed Jun. 3, 1999.

This invention relates to a process for generating recoverable sulfur containing compounds from a spent acid stream. In particular, the invention relates to a process for generating recoverable sulfur compounds from commercial processes for preparing (meth)acrylic acid esters.

Many industrial processes result in the production of spent acids. For instance, (meth)acrylic acid esters generally are prepared with a strong acid, such as sulfuric acid as a direct esterification catalyst. For example, see co-pending U.S. patent application Ser. No. 60/106947. Large amounts of sulfuric acid may be used in these processes. The majority of the sulfuric acid utilized degrades during the esterification process, thus creating a spent acid. For economic and environmental reasons, the spent sulfuric acid is generally recovered and recycled for further use.

To accomplish recycle of a spent sulfuric acid, the spent sulfuric acid is initially separated from the product ester. Once separated, the spent sulfuric acid is subjected to a regeneration process. Generally, the regeneration process includes spraying the spent sulfuric acid into a combustion furnace and generating sulfur dioxide ("$SO_2$"), for instance by combusting and/or thermally decomposing the spent acid. The $SO_2$ is then converted to sulfur trioxide ("$SO_3$") and absorbed in 98% sulfuric acid to obtain 99+% pure sulfuric acid.

One problem associated with combusting and/or thermally decomposing spent acids is the cost of operating a large combustion furnace. The combustion furnaces used to combust and/or thermally decompose spent acids utilize natural gas to combust the spent acid. The natural gas consumption needed to provide the temperature to combust spent acids will vary depending on the spent acid droplet size.

Typically, a droplet of spent acid is large, i.e., the droplet has a Sauter mean diameter of greater than 700 micrometers. A combustion furnace typically must be operated at 1085° C. to 1120° C. to combust or thermally decompose spent acid droplets of this size. In order to reduce the operating cost of the combustion furnace utilized for the combustion or thermal decomposition of the spent acid, it is desirable and advantageous to minimize the spent acid droplet size.

Another problem associated with combusting and/or thermally decomposing spent acids is the amount and pressure of the air flow needed to atomize the spent acid in the furnace. Compressors are needed to generate the air flow. The compressors typically are electric and therefore generally create additional cost in operating the process. However, even with the increased air flow, the droplet size is not optimum. Several approaches have been attempted to overcome these and other problems in spent acid recycling processes.

External air blast nozzles have been used for spraying operations to provide an atomized spent acid stream. Such external air blast nozzles mix air with liquid after the liquid exits the nozzle. These nozzles tend to require high air flow rates, which increases the cost of operation due to energy requirements to operate air compressors.

One approach to minimizing droplet size is to provide a sonicating system which utilizes high pressure gas, i.e., pressure greater than or equal to 75 psig. Sonic Development Corporation disclosed this type of system in its product literature for Sonicore® nozzles. The literature does not specifically disclose the use of this type of system with spraying spent acids from direct esterification processes into combustion furnaces. Also, there is also no mention of reducing the amount of air flow required for the operation. Furthermore, one problem associated with the sonicating system approach to minimizing droplet size is the high cost of compressing the gas. Another problem associated with this type of system is that the spray nozzles can only handle flow rates of approximately 4 to 5 liters per minute. Commercial direct esterification processes can generate in excess of 100 liters of spent acid per minute, therefore the sonicating system may not be useful for these purposes.

U.S. Pat. No. 5,553,783 disclosed a spray nozzle for atomizing a liquid with a gas. The nozzle produces a flat fan spray pattern and greater flow rates. However, the disclosure does not specifically disclose the use of this type of nozzle with spraying spent acids from direct esterification processes into combustion furnaces.

Despite the disclosure of the references, there is a continuing need for a cost efficient process for generating recoverable sulfur compounds from a spent acid, and recovering acid from the sulfur compounds. The present inventor has now discovered a novel process wherein:

1) the spent acid droplet size is minimized, thus reducing operating costs;
2) low air/gas pressure is required to effect the spraying operation;
3) the capacity of such spraying operation is sufficient to be used in a commercial direct esterification process; and
4) the spent acid droplet size is reduced, enabling the furnace to be operated at a lower temperature, thus yielding a more efficient combustion and thermal decomposition process.

In a first aspect of the present invention, there is provided a process including: providing a spent acid stream; spraying the spent acid stream through a low pressure air assisted nozzle to form an atomized spent acid stream; and generating a sulfur dioxide stream from the atomized spent acid stream.

In a second aspect of the present invention, there is provided a process for recovering acid from a spent acid stream including: admixing magnesium sulfate with a spent acid stream; spraying the resultant spent acid stream through a low pressure air assisted nozzle to form an atomized spent acid stream; generating a sulfur dioxide stream from the atomized spent acid stream; catalytically converting the sulfur dioxide to sulfur trioxide; and absorbing the sulfur trioxide in greater than 90 percent by weight sulfuric acid to further concentrate the sulfuric acid.

As used herein, by spent acid is meant residue streams containing sulfur compounds. Also as used herein, by (meth) acrylic is meant both acrylic and methacrylic. For the purposes of this patent application, by air is meant any gaseous stream including, but not limited to air, air enriched with oxygen, pure oxygen, steam, natural gas, process gas streams, and mixtures thereof.

Throughout this specification and claims, unless otherwise indicated, references to percentages are by weight percent and all temperatures are in degree centigrade.

It is also to be understood that for purposes of this specification and claims that the range and ratio limits, recited herein, are combinable. For example, if ranges of 1–20 and 5–15 are recited for a particular parameter, it is understood that ranges of 1–15 or 5–20 are also contemplated.

As described above, acids may be used to catalyze direct esterification reactions. Although the process of the present invention is applicable to a spent acid from any source, it will be described herein in regard to a spent acid generated from a process for preparing methyl methacrylate. During the esterification process, the acids may decompose thus resulting in a spent acid. After the esterification reaction is completed, the ester is separated from impurities, which include the spent acid. The separation may occur through any means known in the art, such as distillation, gravity phase separation, et cetera. Such separation results in a product stream and a spent acid stream. The spent acid stream typically includes, but is not limited to, water, from 20% to 40% sulfuric acid, from 40% to 60% ammonium bisulfite, and possibly other impurities.

The spent acid stream is then sprayed through at least one low pressure air assisted atomizer into a combustion furnace. The low pressure air assisted atomizer may be a low pressure, air assisted spray nozzle. Suitable spray nozzles are disclosed, for instance in U.S. Pat. Nos. 5,553,783, 5,692,682, and 5,240,183 such patents being incorporated herein by reference for their disclosure of such spray nozzles. As described in the '783 patent, the spray nozzle creates an aerated spent acid stream by mixing air and the spent acid stream in a helical vane or spray member. Generally, by air assisted is meant that air is pumped into the nozzle to mix with the spent acid prior to exiting the nozzle tip. This is typically accomplished through the use of at least one air compressor. Typically, the pressure is from 20 psig to 50 psig, preferably 30 psig to 40 psig.

The spray nozzle may have at least one orifice. In a preferred embodiment, the spray nozzle has a plurality of orifices. The size of the orifice will be determined by the volume of the spent acid, the flow rate of the spent acid through the spray nozzle, and the length of the combustion furnace to be utilized. The spray nozzle may be made from any material having suitable compatibility with the process. Compatible materials include, but are not limited to HASTELLOY® B-2 (a nickel-molybdenum alloy produced by Haynes International, Inc., Kokomo, Ind.), HASTELLOY® C (nickel-chromium-molybdenum alloys produced by Haynes International, Inc., Kokomo, Ind.), or zirconium. HASTELLOY® B-2 (a nickel-molybdenum alloy produced by Haynes International, Inc., Kokomo, Ind.) is preferred. The size of the spray nozzle and the number of spray nozzles utilized will depend on the volume of the spent acid generated in the direct esterification process. Such design criteria are within the ability of those skilled in the art, and are not discussed further here.

The combination of low pressure air assistance with at least one orifice in the spray nozzle results in producing small droplets of spent acid, i.e. droplets having a Sauter mean diameter of from 200 micrometers to 700 micrometers, preferably from 300 micrometers to 600 micrometers. Since the droplet size of the spent acid is important, it may be necessary to provide a means for preventing impingement of the atomized streams inside the furnace. Impingement of the atomized streams could increase the droplet size from an acceptable diameter to an unacceptable diameter, causing an increased furnace temperature or a lower atomizer capacity. A swivel joint may be attached to the atomizer to provide the ability to direct the streams inside the furnace and prevent impingement of the streams. When utilized, the swivel joint may move the atomizer up to 20° in any direction.

As is well known in the art, combustion requires oxygen. Any source of oxygen may suffice, such as pure oxygen, air, oxygen enriched air, and mixtures of oxygen with other gasses. The source of oxygen for the process of this invention is partially from the air utilized to increase the pressure the spent acid is sprayed at. The ratio of air to spent acid fed to the spray nozzle typically ranges from 0.01 to 0.1, preferably from 0.025 to 0.075.

Additional oxygen may be required to provide optimal combustion and thermal decomposition. Where additional oxygen is required, oxygen may be fed from a source to the spray nozzle. The source of additional oxygen may be as described above and is not limited to pure oxygen. The amount of additional oxygen fed to the spray nozzle may range from one half percent to 99 percent by volume.

The aerated spent acid stream exits the spray nozzle into a combustion furnace. Any suitable combustion furnace known in the art may be utilized. The size of the combustion furnace will depend on the amount of spent acid to be combusted or thermally decomposed. The combustion furnace generally is fueled by natural gas and is operated at a temperature from 800° C. to 1200° C., preferably from 1000° C. to 1100° C.

The spent acid is sprayed through the combustion furnace at a rate sufficient to provide an efficient combustion or thermal decomposition. The residence time of the spent acid in the combustion furnace will depend on the spent acid droplet size, however typically ranges from 2 seconds to 4 seconds. Fans may be utilized to help carry the combustion or thermal decomposition products through the furnace.

The combustion or thermal decomposition of the spent acid results in the generation of a gaseous sulfur dioxide stream containing mostly sulfur dioxide with some impurities. The sulfur dioxide stream exits the furnace and then is processed to convert the sulfur dioxide to sulfuric acid. In one embodiment, before converting the sulfur dioxide to sulfur trioxide, one or more purification steps may be performed. In a preferred embodiment, the sulfuric acid stream is passed through a heat exchanger to remove water and other impurities by condensation. Any type of heat exchanger known in the art may be utilized. The heat exchanger cools the gaseous stream generally by the flow of a coolant, such as water, external to the gaseous stream.

The sulfur dioxide stream is extremely corrosive and tends to corrode the heat exchangers. In a further embodiment, in order to reduce the corrosion rate of the heat exchanger, magnesium sulfate may be injected into the spent acid stream prior to spraying the spent acid stream into the furnace. The amount of magnesium sulfate fed to the spent acid stream will depend on the concentration of sodium in the spent acid stream, the volume of the spent acid stream, and the concentration of sulfuric acid decomposition products in the spent acid stream. Typically, the ratio of sodium to magnesium in the magnesium sulfate injected spent acid stream is 3.5 or lower. The magnesium sulfate is carried with the sulfur dioxide stream to the heat exchangers and coats the surfaces of the heat exchangers. This results in a decreased corrosion rate for the heat exchangers.

Steam may be generated in the heat exchangers as a result of the cooling of the sulfur dioxide stream. This steam may be used in other processes to drive turbines, or to pre-heat reactors or materials to be used.

The sulfur dioxide stream then exits the heat exchanger and may be further purified, for instance fed to a scrubber, where the stream is further cooled and additional impurities may be removed through contacting them with caustic. As appropriate, additional steps may be taken to remove impurities such as condensation, ionization, and drying, yielding a purified sulfur dioxide stream.

The purified sulfur dioxide stream is then fed to a converter, which utilizes a catalyst to convert the sulfur dioxide to sulfur trioxide in the presence of added oxygen. The oxygen may be added as air, pure oxygen, oxygen enriched air, or any suitable source of oxygen. The catalysts for this process are well known in the art, and include, but are not limited to the Vanadium pentoxide type of catalyst and the Cesium promoted Vanadium pentoxide type of catalyst. The catalyst size may range from 6 mm to 20 mm and be shaped in a form such as, but not limited to, cylindrical, ring, or daisy. The conversion is generally performed at a temperature ranging from 400° C. to 600° C. The ratio of the volume of oxygen to the volume of sulfur dioxide in the reaction typically ranges from 1 to 1.5.

The sulfur trioxide is then contacted with a solution of greater than 90 percent by weight sulfuric acid, preferably greater than 93 percent by weight sulfuric acid, most preferably a range from 96 percent by weight to 98.5 percent by weight sulfuric acid to generate a further concentrated sulfuric acid. In one embodiment, the further concentrated sulfuric acid typically contains 99+ percent by weight sulfuric acid. Water and/or from 90% to 96% sulfuric acid may be added to the 99+ percent by weight sulfuric acid to maintain the acid strength.

The following examples are intended to demonstrate the process of the invention, however should not be construed as limiting the scope of the invention.

EXAMPLE 1
External Air Blast Nozzle (Comparative)

Spent acid was obtained from a methyl methacrylate production process and fed through an external air blast nozzle to a furnace. The external air blast nozzle was manufactured internally and operated at a pressure of 30 psig air and 50 psig liquid to obtain a stream having a spent acid droplet size of 900 micrometers. The process was monitored visually by looking for flaking and incomplete droplet decomposition, which would indicate incomplete combustion, and was found to be satisfactory. The furnace was operated at 1100° C. to 1120° C., and the spent acid was thermally decomposed to $SO_2$. The $SO_2$ was passed through a heat exchanger to remove water by condensation and converted to $SO_3$ in the presence of added air in an amount suitable to supply a molar excess of oxygen over a Vanadium pentoxide catalyst available from Haldor Topsoe A/S of Lyngby, Denmark. The $SO_3$ was contacted with a 96 weight percent sulfuric acid stream to generate a 99 percent by weight sulfuric acid stream. The ratio of air flow to spent acid feed required to obtain a 99 percent by weight sulfuric acid stream was calculated from the air flow and the liquid flow into the nozzle and found to be 0.25 at an air pressure of from 20 psig to 25 psig.

EXAMPLE 2
Low Pressure Air Assisted Nozzle

Spent acid was obtained from a methyl methacrylate production process and fed through a low pressure air assisted nozzle to a furnace. The low pressure air assisted nozzle was obtained from Bete Fog Nozzle, Inc., of Greenfield, Mass. and operated at a pressure of from 30 psig to 50 psig air to obtain a stream having a spent acid droplet size of 600 micrometers. The process was monitored visually as in Example 1, and found to be satisfactory. The furnace was operated at from 1050° C. to 1100° C., and the spent acid was thermally decomposed to $SO_2$. The $SO_2$ was passed through a heat exchanger to remove water by condensation and converted to $SO_3$ in the presence of added air in an amount suitable to supply a molar excess of oxygen over a Vanadium pentoxide catalyst available from Haldor Topsoe A/S. The $SO_3$ was contacted with a 96 weight percent sulfuric acid stream to generate a 99 percent by weight sulfuric acid stream. The ratio of air flow to spent acid feed required to obtain a 99 percent by weight sulfuric acid stream was calculated from the air flow and the liquid flow into the nozzle and found to be 0.034.

These results indicate that the process of the present invention reduces the droplet size of the spent acid fed to the furnace and reduces the amount of air flow required to feed the spent acid to the furnace. Therefore, the process of the present invention is less expensive to operate than the process known in the art.

We claim:

1. A process for generating recoverable sulfur containing compounds from a spent sulfuric acid stream comprising:

providing a spent sulfuric acid stream;

admixing the spent sulfuric acid stream with magnesium sulfate;

spraying the resultant spent sulfuric acid stream into a furnace through a low pressure air assisted nozzle to form an atomized spent sulfuric acid stream while combusting a fuel in the furnace thereby generating a sulfur dioxide steam from the atomized spent sulfuric acid stream.

2. The process according to claim 1 wherein the nozzle has a plurality of orifices.

3. The process according to claim 1 wherein spraying the spent sulfuric acid stream through a low pressure air assisted nozzle results in spent sulfuric acid droplets having a Sauter mean diameter of from 200 micrometers to 700 micrometers.

4. The process according to claim 3 wherein the spent sulfuric acid droplets have a Sauter mean diameter of from 300 micrometers to 600 micrometers.

5. The process according to claim 3 wherein the temperature the furnace is operated at is from 800° C. to 1200° C.

6. The process according to claim 5 wherein the temperature the furnace is operated at is from 1000° C. to 1100° C.

7. The process according to claim 1 wherein the ratio of air to spent sulfuric acid fed to the the spray nozzle is from 0.01 to 0.1:1.

8. The process according to claim 1 wherein the ratio of air to spent sulfuric acid fed to the spray nozzle is from 0.025 to 0.075:1.

9. A process for recovering acid from a spent sulfuric acid stream comprising:

admixing magnesium sulfate with a spent sulfuric acid stream;

spraying the resultant spent sulfuric acid stream into a furnace through a low pressure air assisted nozzle to form an atomized spent acid stream while combusting a fuel in the furnace thereby generating a sulfur dioxide stream from the atomized spent sulfuric acid stream;

catalytically converting the sulfur dioxide to sulfur trioxide; and adsorbing the sulfur trioxide in a sulfuric acid solution of a concentration greater than 90 percent by weight of sulfuric acid to further concentrate the sulfuric acid solution.

* * * * *